United States Patent
Huang (10) Patent No.: US 10,915,988 B2
(45) Date of Patent: Feb. 9, 2021

(54) IMAGE STITCHING METHOD AND RELATED MONITORING CAMERA DEVICE

(71) Applicant: VIVOTEK INC., New Taipei (TW)

(72) Inventor: Chao-Tan Huang, New Taipei (TW)

(73) Assignee: VIVOTEK INC., New Taipei (TW)

(*) Notice: Subject to any disclaimer, the term of this patent is extended or adjusted under 35 U.S.C. 154(b) by 59 days.

(21) Appl. No.: 16/435,553

(22) Filed: Jun. 9, 2019

(65) Prior Publication Data
US 2020/0184599 A1    Jun. 11, 2020

(30) Foreign Application Priority Data
Dec. 11, 2018    (TW) .............................. 107144489 A (51) Int. Cl.
*G06T 3/40*    (2006.01)
*G06T 7/246*    (2017.01)
*G06T 7/32*    (2017.01)

(52) U.S. Cl.
CPC ............ *G06T 3/4038* (2013.01); *G06T 7/246* (2017.01); *G06T 7/32* (2017.01)

(58) Field of Classification Search
CPC combination set(s) only.
See application file for complete search history.

(56) References Cited

U.S. PATENT DOCUMENTS

| | | | | |
|---|---|---|---|---|
| 2014/0270537 A1* | 9/2014 | Lo | ............................ | G06T 15/20 382/195 |
| 2015/0281594 A1* | 10/2015 | Sakaniwa | .............. | H04N 5/265 348/218.1 |
| 2016/0086033 A1* | 3/2016 | Molin | .................. | G06K 9/4652 345/419 |
| 2017/0148138 A1 | 5/2017 | Liu | | |
| 2017/0148175 A1* | 5/2017 | Liu | ............................ | G06T 7/11 |
| 2017/0347023 A1 | 11/2017 | Tsang | | |

FOREIGN PATENT DOCUMENTS

| | | |
|---|---|---|
| TW | 201635194 A | 10/2016 |
| TW | 201720132 A | 6/2017 |
| TW | I639136 B | 10/2018 |

OTHER PUBLICATIONS

Cheng-Ming Huang, "Efficient Image Stitching of Continuous Image Sequence With Image and Seam Selections", IEEE Sensors Journal, vol. 15, No. 10, Oct. 2015, pp. 5910-5915.*

* cited by examiner

*Primary Examiner* — Omar S Ismail
(74) *Attorney, Agent, or Firm* — Winston Hsu

(57) ABSTRACT

An image stitching method capable of effectively decreasing an amount of sampling points is applied to a first monitoring image and a second monitoring image overlapped with each other and generated by a monitoring camera device. The image stitching method includes acquiring a first sampling point and a second sampling point respectively on the first monitoring image and the second monitoring image, detecting a first specific parameter of the first monitoring image and a second specific parameter of the second monitoring image, determining whether the first sampling point is matched with the second sampling point according to the first specific parameter and the second specific parameter, and deciding whether to stitch the first monitoring image and the second monitoring image by the first sampling point and the second sampling point according a determination result.

20 Claims, 9 Drawing Sheets

IMAGE STITCHING METHOD AND RELATED MONITORING CAMERA DEVICE

BACKGROUND OF THE INVENTION

1. Field of the Invention

The present invention relates to an image stitching method and a related monitoring camera device, and more particularly, to an image stitching method of decreasing the amount of sampling points and increasing computation efficiency and a related monitoring camera device.

2. Description of the Prior Art

With the advanced technology, a monitoring camera can have a plurality of image capturing device adapted to respectively capture a small-range monitoring image from different angles of view, and those small-range monitoring images can be stitched for forming a wide-angle monitoring image. The small-range monitoring images are partly overlapped. A conventional image stitching technology detects an overlapped area between the small-range monitoring images to search feature points appeared in two adjacent small-range monitoring images for executing image stitching process. The monitoring camera is disposed on a heavy traffic area. A large number of passerby and vehicle is appeared in the monitoring image and can be used as the feature point. Any object appeared at different points of time can be used as the feature point, and computational efficiency of the image stitching process is decreased via a great quantity of the feature points. Therefore, design of an image stitching method capable of eliminating the false feature points, decreasing an amount of the feature points and increasing the computational efficiency is an important issued in the related monitoring industry.

SUMMARY OF THE INVENTION

The present invention provides an image stitching method of decreasing the amount of sampling points and increasing computation efficiency and a related monitoring camera device for solving above drawbacks.

According to the claimed invention, an image stitching method of effectively decreasing an amount of sampling points is applied to a first monitoring image and a second monitoring image overlapped with each other. The image stitching method includes acquiring a first sampling point on the first monitoring image and a second sampling point on the second monitoring image, detecting a first specific parameter of the first monitoring image and a second specific parameter of the second monitoring image, determining whether the first sampling point is matched with the second sampling point according to the first specific parameter and the second specific parameter, and deciding whether to stitch the first monitoring image and the second monitoring image by the first sampling point and the second sampling point according to a matching result.

According to the claimed invention, a monitoring camera device includes a first image receiver, a second image receiver and an operation processor. The first image receiver is adapted to generate a first monitoring image. The second image receiver is adapted to generate a second monitoring image partly overlapped with the first monitoring image. The operation processor is electrically connected to the first image receiver and the second image receiver. The operation processor is adapted to acquire a first sampling point on the first monitoring image and a second sampling point on the second monitoring image, to detect a first specific parameter of the first monitoring image and a second specific parameter of the second monitoring image, to determine whether the first sampling point is matched with the second sampling point according to the first specific parameter and the second specific parameter, and to decide whether to stitch the first monitoring image and the second monitoring image by the first sampling point and the second sampling point according to a matching result.

The image stitching method and the related monitoring camera device of the present invention utilize a group consisting of space analysis in the first embodiment, period analysis in the second embodiment, speed analysis in the third embodiment, trace analysis in the further embodiment, and a combination thereof to effectively eliminate the sampling points which do not conform to the predefined condition, so as to decrease the amount of the false sampling points, and increase computation efficiency and accuracy of the image stitching process accordingly.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
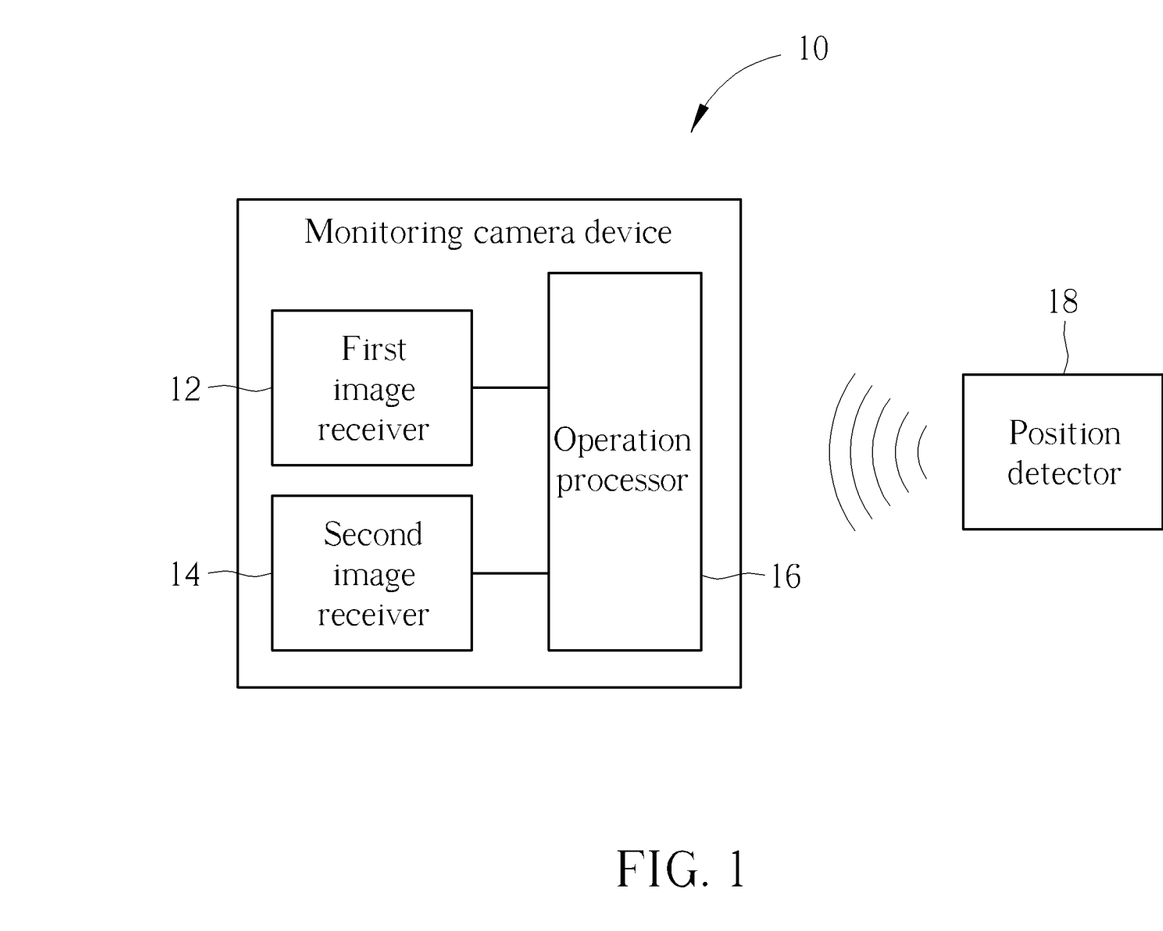
FIG. 1 is a functional block diagram of a monitoring camera device according to an embodiment of the present invention.
Figure 2:
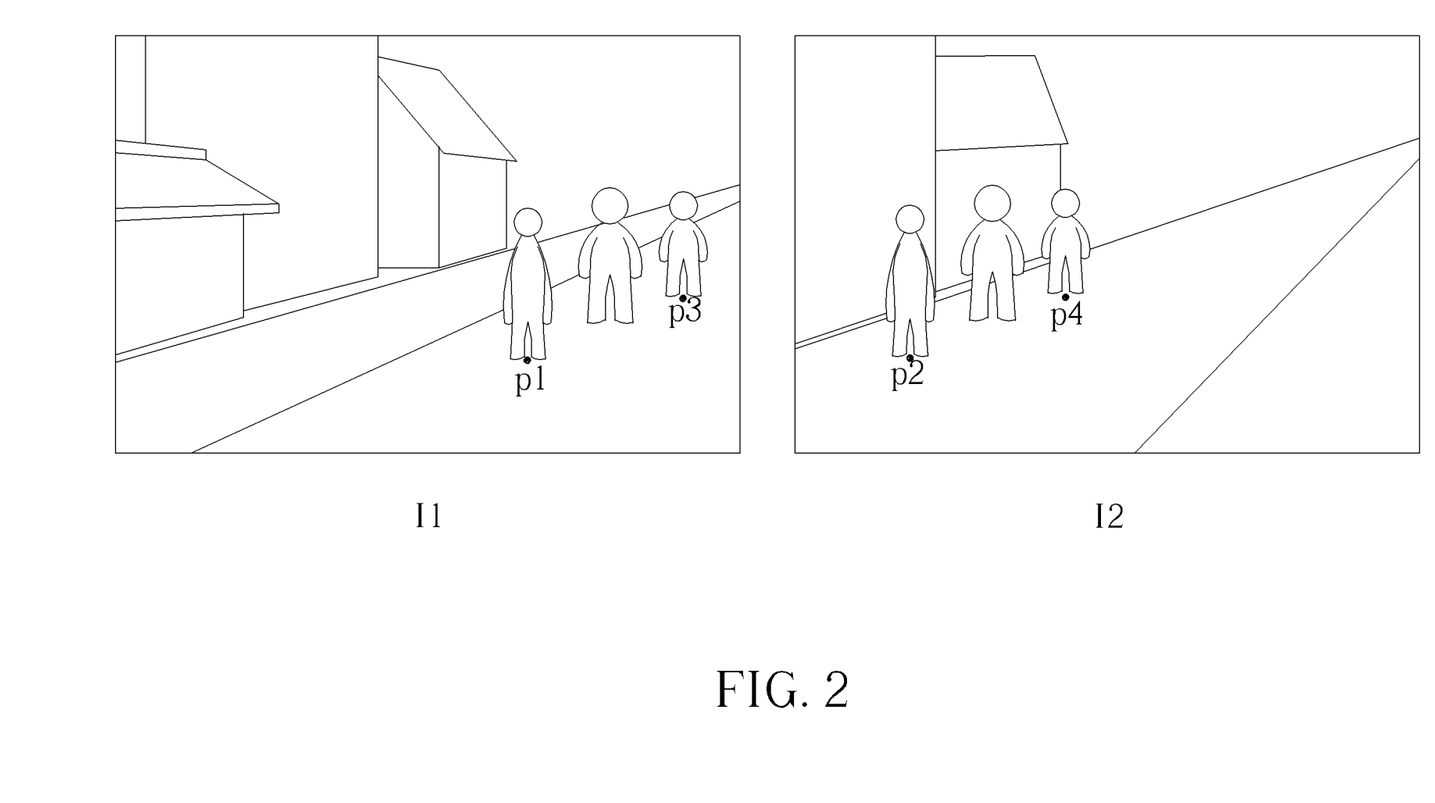
FIG. 2 is a diagram of a first monitoring image and a second monitoring image acquired by the monitoring camera device according to the embodiment of the present invention.

Please refer to FIG. 1 and FIG. 2. FIG. 1 is a functional block diagram of a monitoring camera device 10 according to an embodiment of the present invention. FIG. 2 is a diagram of a first monitoring image I1 and a second monitoring image I2 acquired by the monitoring camera device 10 according to the embodiment of the present invention. The monitoring camera device 10 can include a first image receiver 12, a second image receiver 14 and an operation processor 16 electrically connected with each other. The first image receiver 12 and the second image receiver 14 can respectively acquire the first monitoring image I1 and the second monitoring image I2. A field of view of the first image receiver 12 is overlapped with a field of view of the second image receiver 14, so that the first monitoring image I1 and the second monitoring image I2 can be partly overlapped. The first monitoring image I1 can have one or several first sampling points p1, and the second monitoring image I2 can have one or several second sampling point p2. The operation processor 16 can utilize specific parameters to eliminate sampling points which do not conform to a predefined condition inside the monitoring images I1 and I2, so as to increase operational efficiency of image stitching process via a small amount of sampling points.

Figure 3:
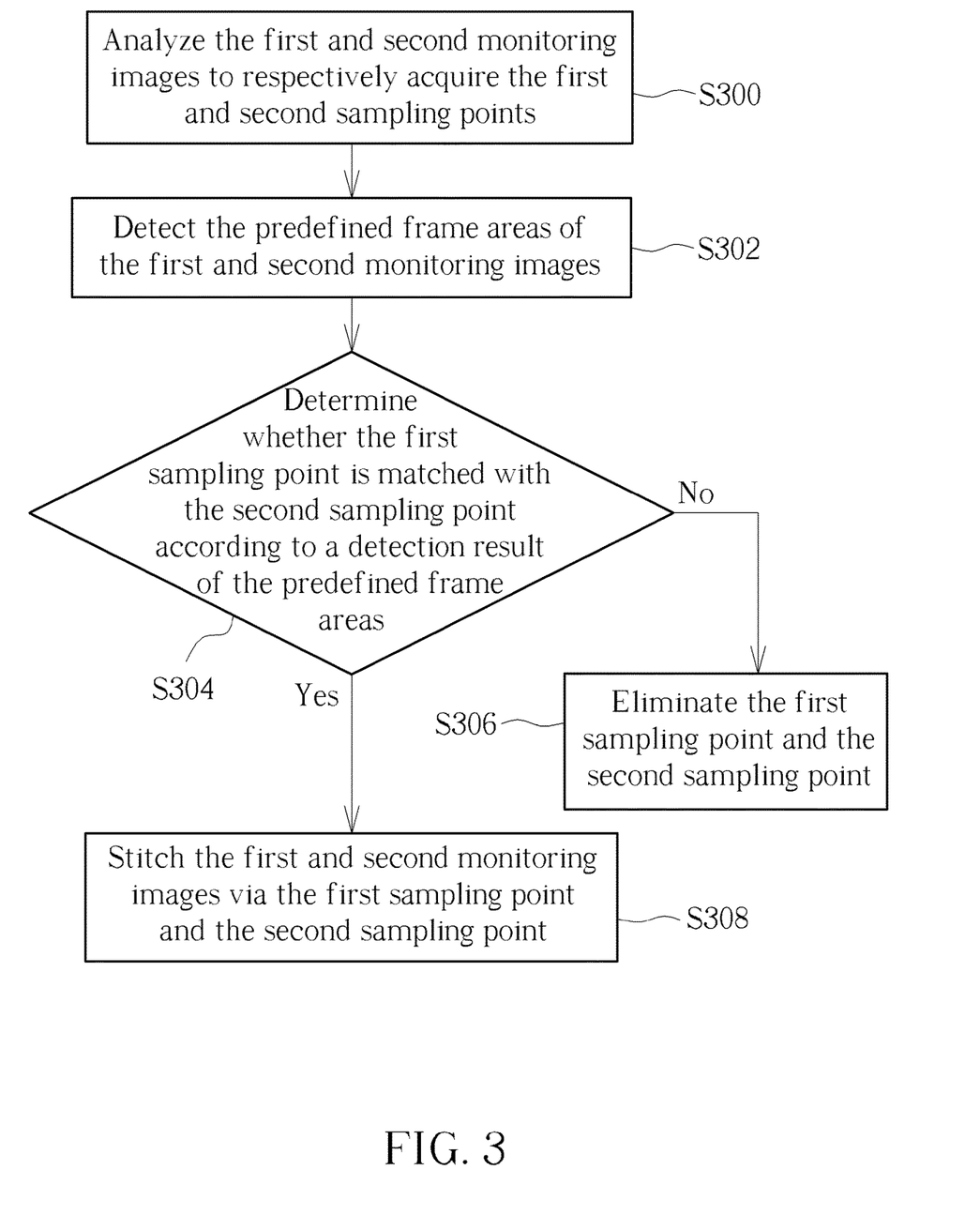
FIG. 3 is a flow chart of an image stitching method according to a first embodiment of the present invention.
Figure 4:
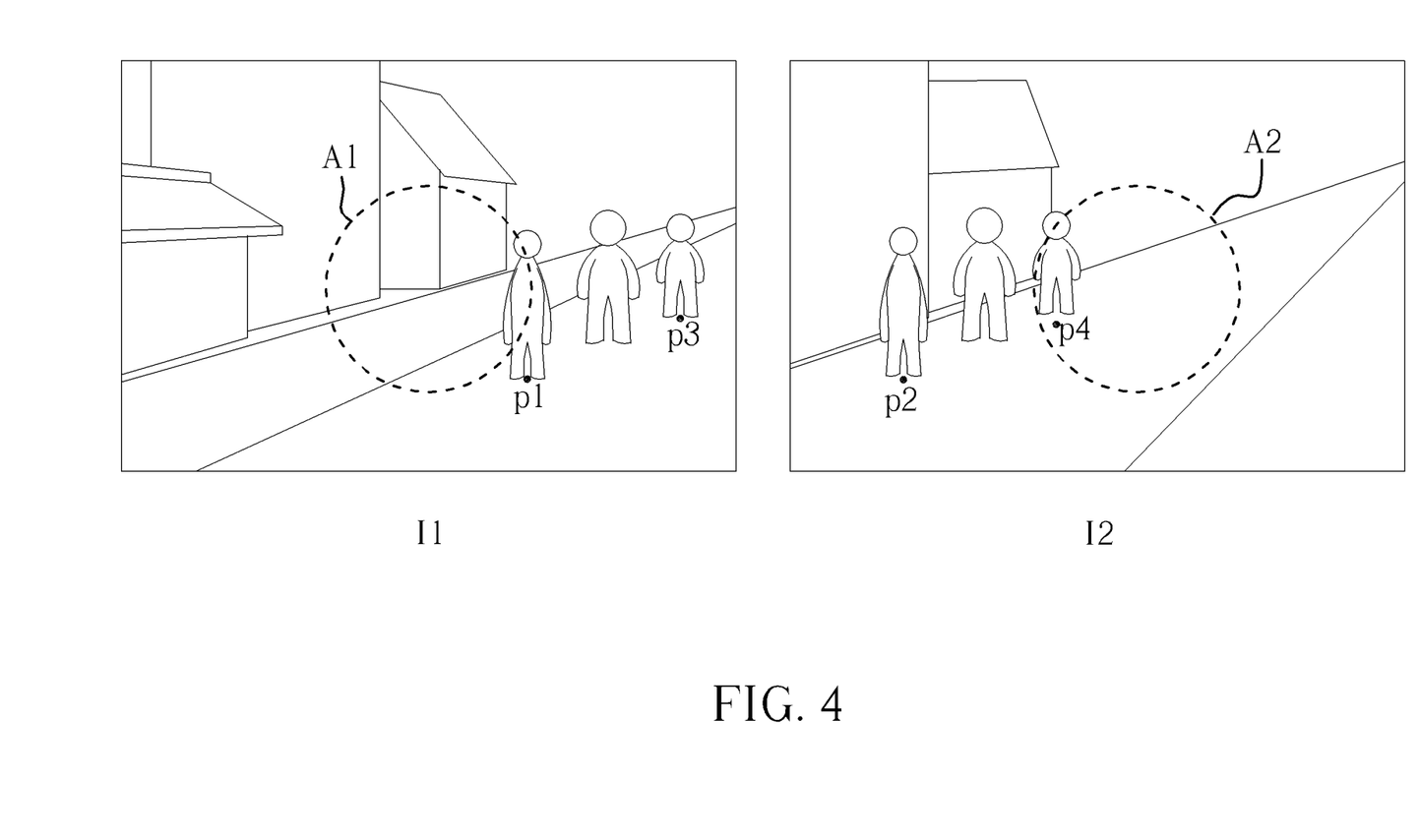
FIG. 4 is a diagram of the monitoring images according to the first embodiment of the present invention.

Please refer to FIG. 1 to FIG. 4. FIG. 3 is a flow chart of an image stitching method according to a first embodiment of the present invention. FIG. 4 is a diagram of the monitoring images I1 and I2 according to the first embodiment of the present invention. The image stitching method illustrated in FIG. 3 is suitable for the monitoring camera device 10 shown in FIG. 1. First, step S300 is executed that the operation processor 16 can analyze the first monitoring image I1 and the second monitoring image I2 to respectively acquire the first sampling point p1 and second sampling point p2. Then, steps S302 and S304 are executed that the operation processor 16 can detect a predefined frame area A1 on the first monitoring image I1 and a predefined frame area A2 on the second monitoring image I2, and determine whether the first sampling point p1 is matched with the second sampling point p2 according to a detection result of the predefined frame areas A1 and A2. In the first embodiment, the predefined frame areas A1 and A2 can be represented as a first specific parameter and a second specific parameter of the monitoring images I1 and I2 for adjusting an amount of the sampling points.

The predefined frame area A1 can be a center area on the first monitoring image I1, and the predefined frame area A2 can be a center area on the second monitoring image I2. Application of the predefined frame areas A1 and A2 is not limited to the above-mentioned embodiment, which depends on actual demand. For example, the predefined frame areas A1 and A2 may be a right-side area or a left-side area on the monitoring images I1 and I2. The predefined frame areas A1 and A2 can be a circular form (which can be shown in FIG. 4), or can be an elliptical form, a square form or a rectangle form (which are not shown in the figures). The center area can be based on the circular form or the square form automatically extended from a central point of the monitoring images I1 and I2; besides, the center area may be drawn manually by the user.

If the first sampling point p1 and the second sampling point p2 are respectively located inside the predefined frame area A1 and the predefined frame area A2, step S306 is executed to determine the first sampling point p1 is not matched with the second sampling point p2, and then eliminate the first sampling point p1 and the second sampling point p2 accordingly, which means the operation processor 16 does not utilize the sampling points p1 and p2 to execute the following image stitching process. If the first sampling point p1 and the second sampling point p2 are respectively located outside the predefined frame area A1 and the predefined frame area A2, step S308 is executed to determine the first sampling point p1 is matched with the second sampling point p2, and the operation processor 16 can stitch the first monitoring image I1 and the second monitoring image I2 via the sampling points p1 and p2. Thus, the fields of view about the first image receiver 12 and the second image receiver 14 are partly overlapped, and its overlapped portion is not in the center area on the monitoring images I2 and I2, so that the present invention can rapidly eliminate the unqualified sampling points via analysis of the overlapped portion, for effectively decreasing a computation quantity of the image stitching process executed by the monitoring camera device 10.

It should be mentioned that two adjacent images have to find out at least two feature points, for acquiring an accurate image stitching effect. The image stitching method can further acquire a third sampling point p3 and a fourth sampling point p4 respectively on the first monitoring image I1 and the second monitoring image I2, and determine whether the third sampling point p3 is matched with the fourth sampling point p4 by detecting the first specific parameter of the first monitoring image I1 and the second specific parameter of the second monitoring image I2. If the third sampling point p3 and the fourth sampling point p4 are not matched, the image stitching method may search other sampling points for matching. If the third sampling point p3 and the fourth sampling point p4 are matched, the first monitoring image I1 and the second monitoring image I2 can be stitched correctly via the first sampling point p1, the second sampling point p2, the third sampling point p3 and the fourth sampling point p4.

Another possible application is to find out a relation between the first sampling point p1 and the second sampling point p2 via a specific algorithm. The relation is used to transform a coordinate system of the second monitoring image I2 into a coordinate system of the first monitoring image I1, and for example, the relation can be represented as one transformation formula. Therefore, the first monitoring image I1 and the second monitoring image I2 may not be actually stitched. The first sampling point p1 and the second sampling point p2 can be analyzed to acquire the relation, which is directly applied to transformation in the coordinate system between the first monitoring image I1 and the second monitoring image I2.

Figure 5:
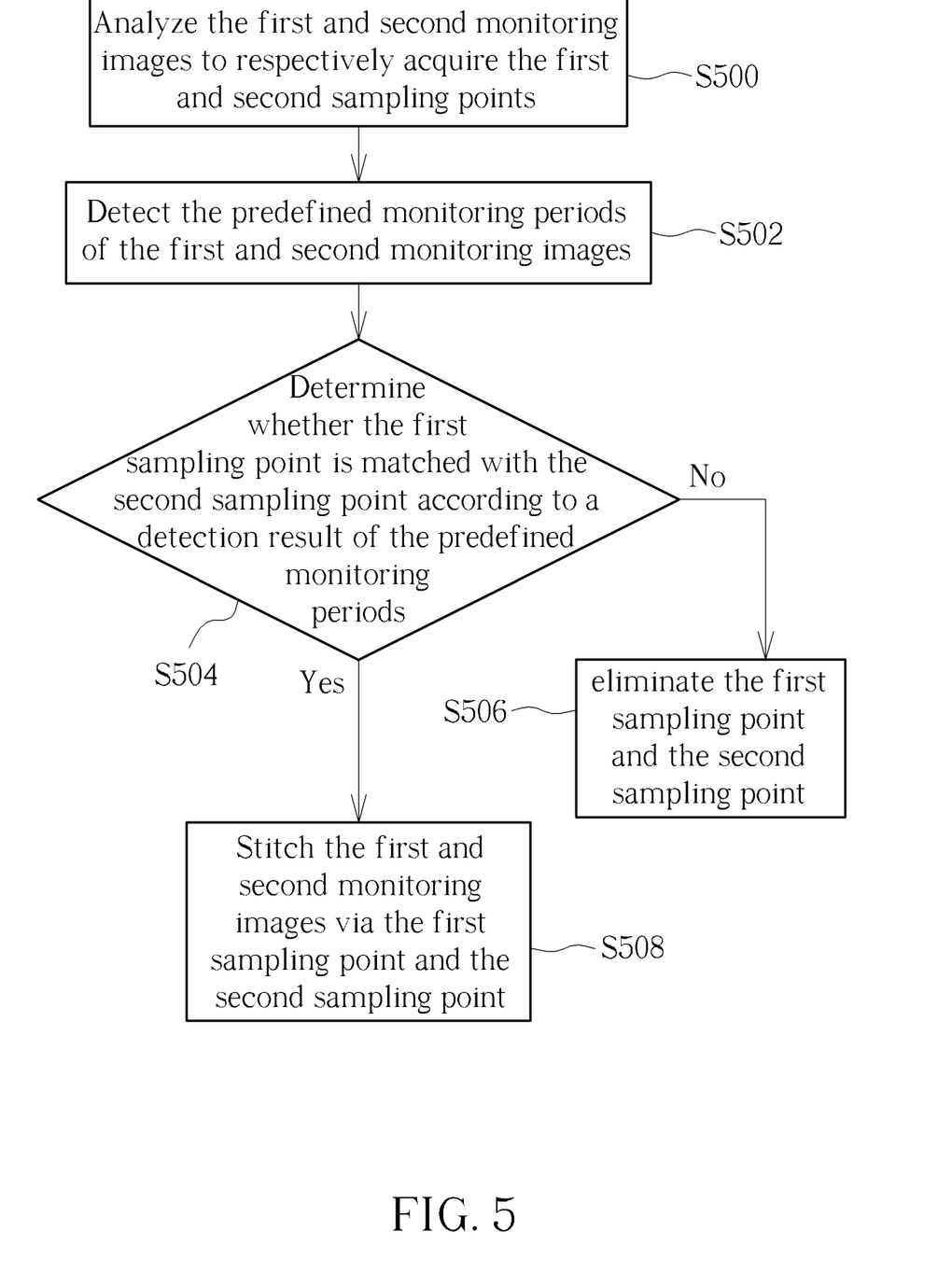
FIG. 5 is a flow chart of the image stitching method according to a second embodiment of the present invention.

Please refer to FIG. 1, FIG. 2 and FIG. 5. FIG. 5 is a flow chart of the image stitching method according to a second embodiment of the present invention. The image stitching method illustrated in FIG. 5 is suitable for the monitoring camera device 10 shown in FIG. 1. First, step S500 is executed that the operation processor 16 can analyze the first monitoring image I1 and the second monitoring image I2 to respectively one or several first sampling points p1 and second sampling points p2. Then, steps S502 and S504 are executed that the operation processor 16 can detect a predefined monitoring period of the first monitoring image I1 and a predefined monitoring period of the second monitoring image I2, and determine whether the first sampling point p1 is matched with the second sampling point p2 according to detection results of two predefined monitoring periods. If the first sampling point p1 and the second sampling point p2 are not respectively appeared in the first monitoring image I1 and the second monitoring image I2 during the predefined monitoring periods, the first sampling point p1 and the second monitoring image I2 may belong to different target objects, and step S506 is executed to determine the first sampling point p1 cannot be matched with the second sampling point p2, and the first sampling point p1 and the second sampling point p2 are eliminated in the following image stitching process.

The predefined monitoring periods can be represented as the first specific parameter and second specific parameter of the monitoring images I1 and I2 for adjusting the amount of the sampling points. A length of each predefined monitoring period can be set according to a property of the target object. For example, if the target object is a vehicle, the predefined monitoring period can be set as a short period because the vehicle moves fast; if the target object is a passerby, the predefined monitoring period can be set as a long period because the passerby moves slowly.

If the first sampling point p1 is detected as appearing in the first monitoring image I1 during the predefined monitoring period and the second sampling point p2 is detected as appearing in the second monitoring image I2 during the predefined monitoring period, the first sampling point p1 and the second monitoring image I2 belong to the same target object, and step S508 is executed to determine the first sampling point p1 is matched with the second sampling point p2, and the operation processor 16 can stitch the first monitoring image I1 and the second monitoring image I2 via the sampling points p1 and p2. In the second embodiment, the monitoring camera device 10 can synchronize the first image receiver 12 and the second image receiver 14 for a start, so that the sampling points both appeared in the first monitoring image I1 and the second monitoring image I2 during the same predefined monitoring period can be represented as the target object, and thus the first sampling point p1 can be matched with the second monitoring image I2.

Figure 6:
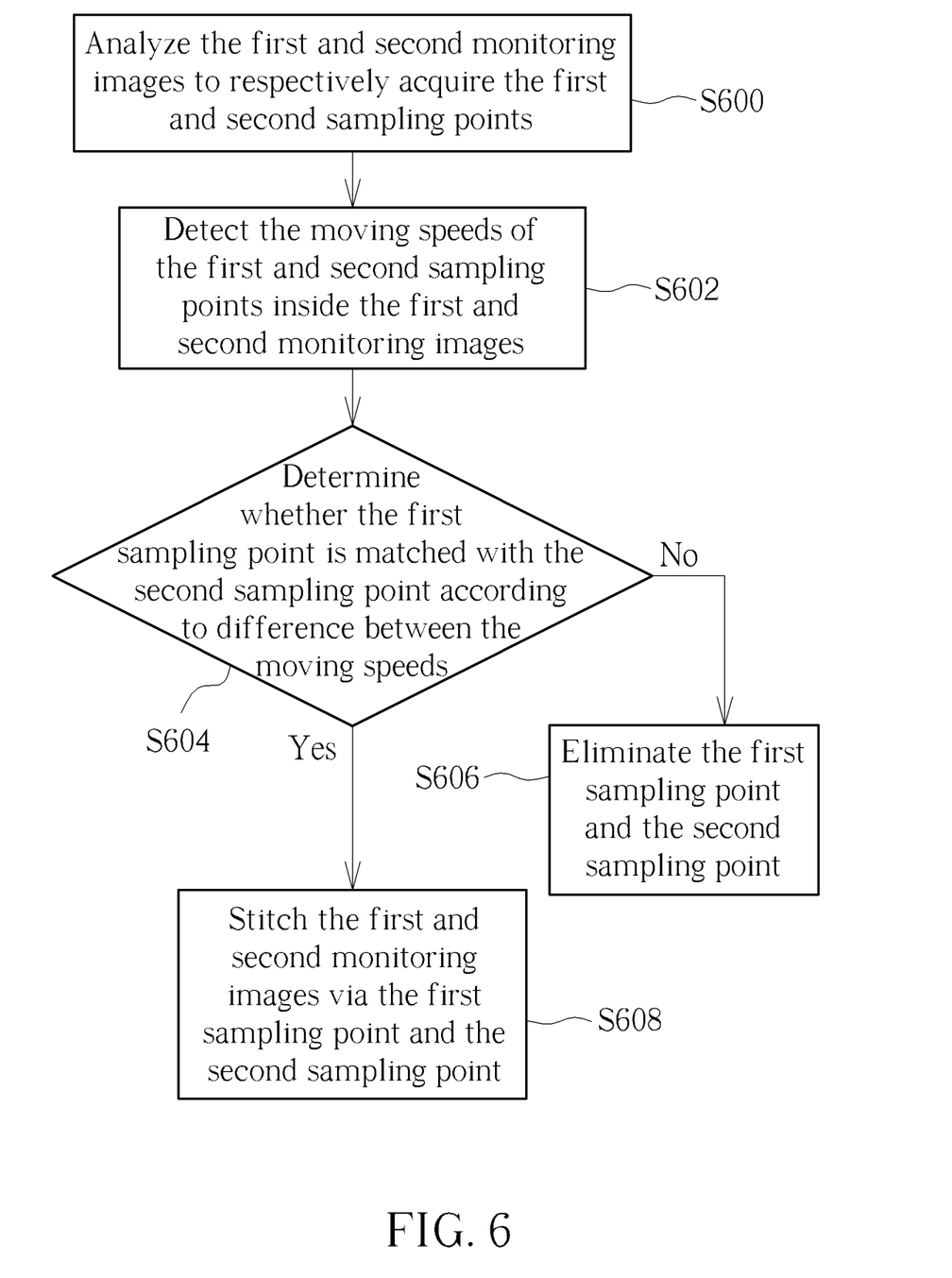
FIG. 6 is a flow chart of the image stitching method according to a third embodiment of the present invention.

Please refer to FIG. 1, FIG. 2, and FIG. 6. FIG. 6 is a flow chart of the image stitching method according to a third embodiment of the present invention. The image stitching method illustrated in FIG. 6 is suitable for the monitoring camera device 10 shown in FIG. 1. First, step S600 is executed that the operation processor 16 can analyze the first monitoring image I1 and the second monitoring image I2 to respectively acquire one or more first sampling points p1 and second sampling points p2. Then, steps S602 and S604 are executed that the operation processor 16 can detect one moving speed of the first sampling point p1 inside the first monitoring image I1 and another moving speed of the second sampling point p2 inside the second monitoring image I2, and determine whether the first sampling point p1 is matched with the second sampling point p2 according to difference between foresaid two moving speeds. The moving speeds can be represented as the first specific parameter and the second specific parameter of the monitoring images I1 and I2 for adjusting the amount of the sampling points. If the difference between the two moving speeds of the first sampling point p1 and the second sampling point p2 is greater than a predefined speed threshold, the first image receiver 12 and the second image receiver 14 may detect different target objects, so that step S606 is executed to determine the first sampling point p1 is not matched with the second sampling point p2. If the difference between the two moving speeds of the first sampling point p1 and the second sampling point p2 is smaller than the predefined speed threshold, the first sampling point p1 is matched with the second sampling point p2 for the following image stitching process.

Figure 7:
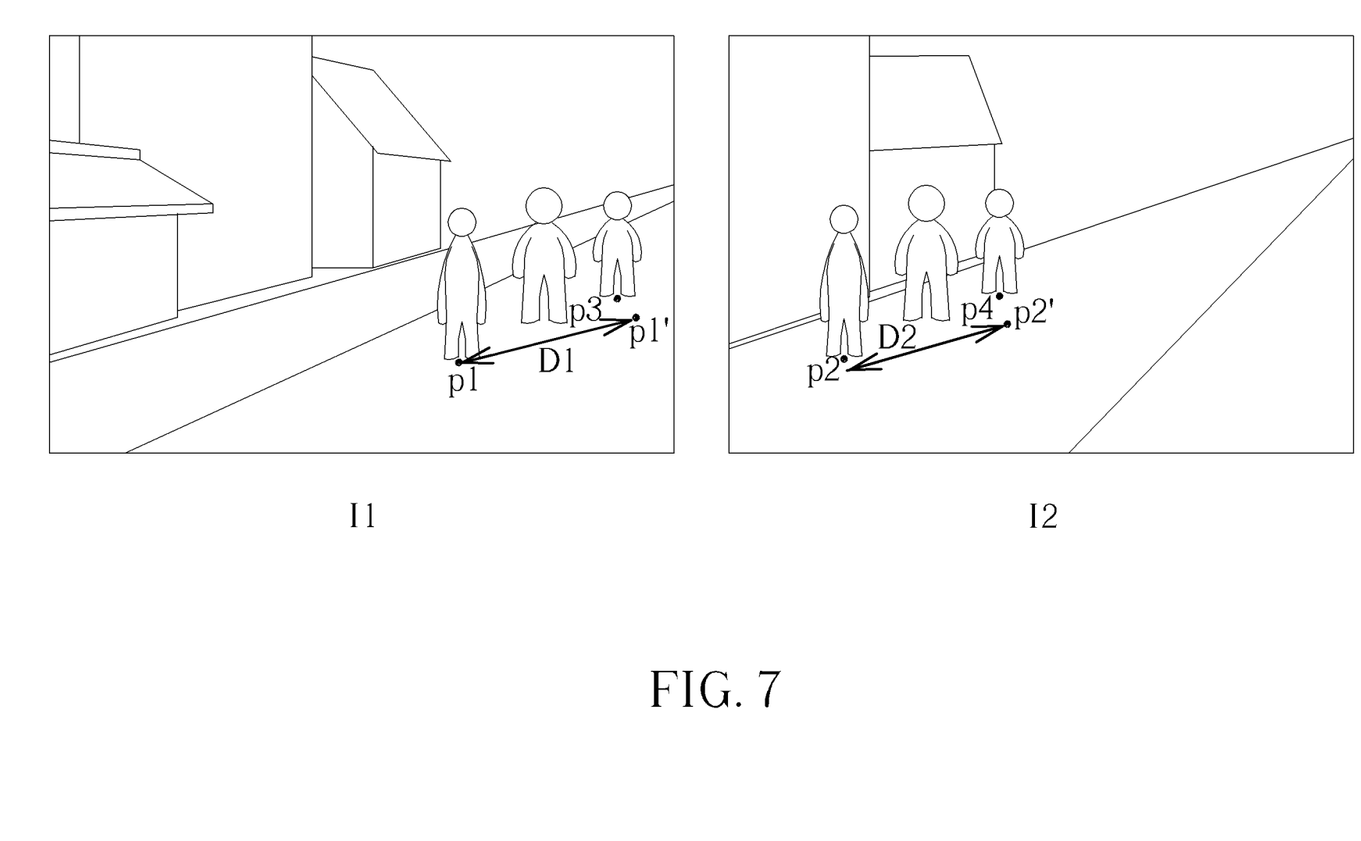
FIG. 7 is a diagram of the monitoring images according to the third embodiment of the present invention.

Please refer to FIG. 6 and FIG. 7. FIG. 7 is a diagram of the monitoring images I1 and I2 according to the third embodiment of the present invention. In the third embodiment, the operation processor 16 can directly detect position variation of the first sampling point p1 and the second sampling point p2 respectively inside the first monitoring image I1 and the second monitoring image I2 during a time unit. For example, the target object may be detected as two first sampling points p1 and p1' and two second sampling points p2 and p2' at different points of time. The moving distance D1 of the target object during the time unit can be difference between the first sampling points p1 and p1', and the moving distance D2 of the target object during the time unit can be difference between the second sampling points p2 and p2'; the moving speed can be computed accordingly. In addition, the predefined monitoring period mentioned in the second embodiment can be used to determine whether the moving distance D1 of the first sampling point p1 and the moving distance D2 of the second sampling point p2 during the predefined monitoring period exceed a predefined range. If the moving distances D1 and D2 of the first sampling point p1 and second sampling point p2 during the predefined monitoring period are not inside the predefined range, the first sampling point p1 cannot be matched with the second sampling point p2; if the moving distances D1 and D2 of the first sampling point p1 and the second sampling point p2 during the predefined monitoring period are both inside the predefined range, the moving speeds of the first sampling point p1 and the second sampling point p2 may be the same, and the first sampling point p1 can be matched with the second sampling point p2.

The operation processor 16 can further set a distance threshold, and the predefined monitoring period mentioned in the second embodiment can be applied for comparing difference between two moving distances (which means the difference between the moving distances D1 and D2) of the first sampling point p1 and the second sampling point p2 during the predefined monitoring period with the distance threshold. If the foresaid difference exceeds the distance threshold, the first sampling point p1 and the second sampling point p2 may not belong to the same target object, and the first sampling point p1 cannot be matched with the second sampling point p2. If the difference does not exceed the distance threshold, the first sampling point p1 and the second sampling point p2 may belong to the same target object, and the first sampling point p1 can be matched with the second sampling point p2.

Figure 8:
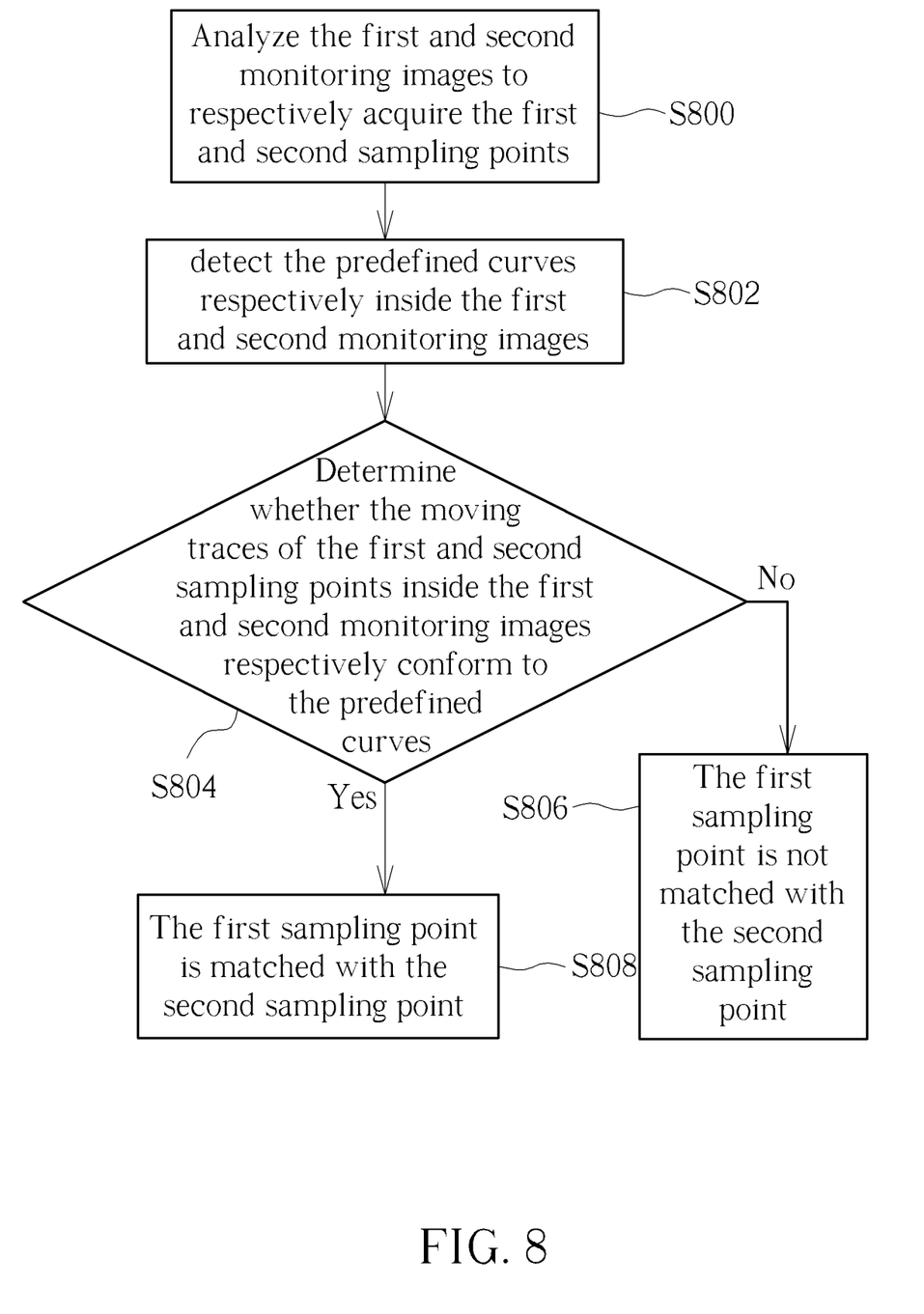
FIG. 8 is a flow chart of the image stitching method according to a fourth embodiment of the present invention.
Figure 9:
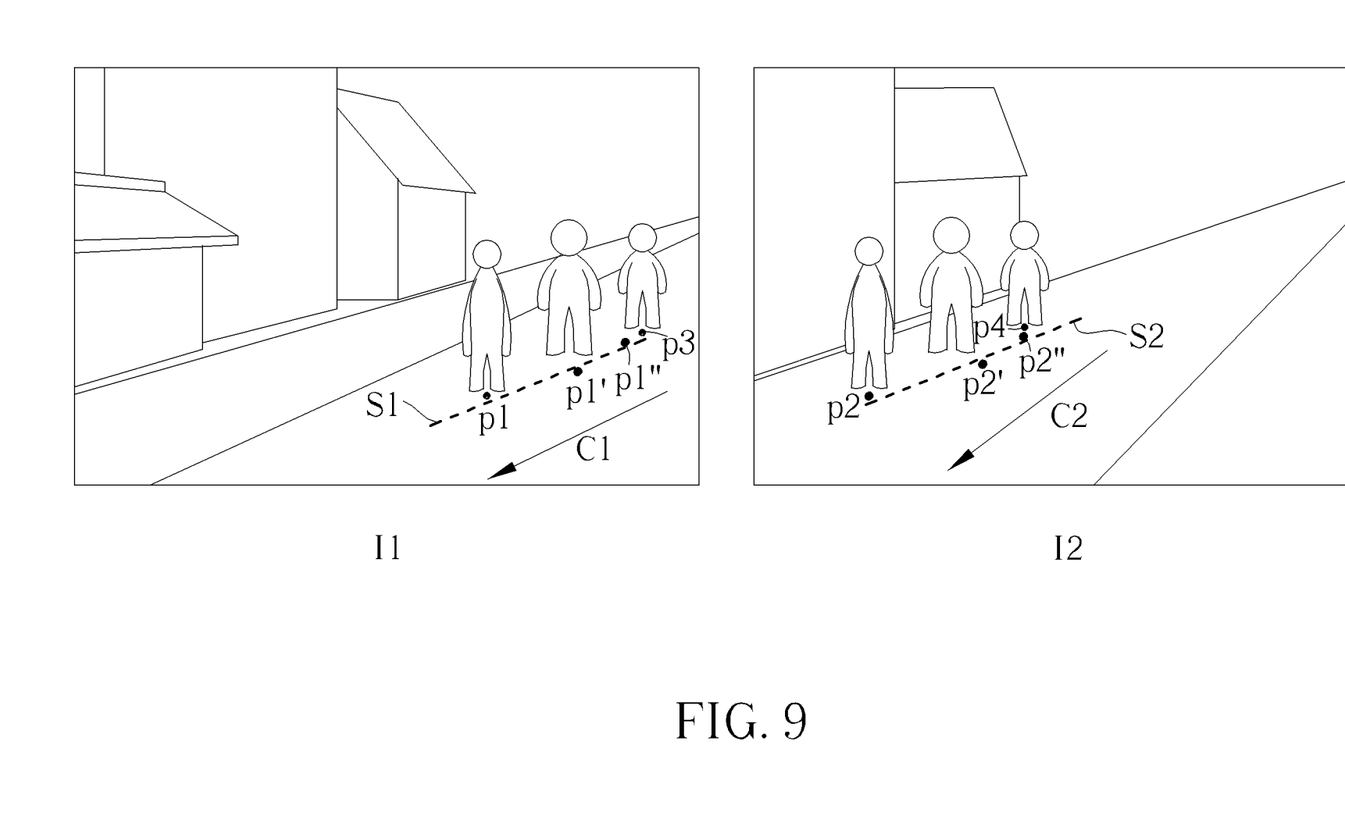
FIG. 9 is a diagram of the monitoring images according to the fourth embodiment of the present invention.

Please refer to FIG. 1, FIG. 8 and FIG. 9. FIG. 8 is a flow chart of the image stitching method according to a fourth embodiment of the present invention. FIG. 9 is a diagram of the monitoring images I1 and I2 according to the fourth embodiment of the present invention. The image stitching method illustrated in FIG. 8 is suitable for the monitoring camera device 10 shown in FIG. 1. Step S800 is executed that the operation processor 16 can analyze the first monitoring image I1 and the second monitoring image I2 to respectively acquire one or more first sampling points p1 and second sampling points p2. Steps S802 and S804 are executed that the operation processor 16 can detect a predefined curve C1 inside the first monitoring image I1 and a predefined curve C2 inside the second monitoring image I2, and determine whether one moving trace of the first sampling point p1 inside the first monitoring image I1 conforms to the predefined curve C1 and another moving trace of the second sampling point p2 inside the second monitoring image I2 conforms to the predefined curve C2.

If the moving traces of the first sampling point p1 and the second sampling point p2 do not respectively conform to the predefined curve C1 and the predefined curve C2, step S806 is executed to determine the first sampling point p1 is not matched with the second sampling point p2. If the moving traces of the first sampling point p1 and the second sampling point p2 respectively conform to the predefined curve C1 and the predefined curve C2, step S808 is executed to determine the first sampling point p1 is matched with the second sampling point p2 for the following image stitching process. In steps S806 and S808, the operation processor 16 can compare coordinate difference between the first sampling point p1, p1' and p1" and the predefined curve C1 with the distance threshold, and further compare coordinate difference between the second sampling point p2, p2' and p2" and the predefined curve C2 with the distance threshold. The target object detected at different points of time can be the foresaid sampling points p1, p1' and p1", and the foresaid sampling points p2, p2' and p2".

If at least one of the coordinate difference between the first sampling point p1, p1' and p1" and the predefined curve C1 and the coordinate difference between the second sampling point p2, p2' and p2" and the predefined curve C2 is greater than the distance threshold, the moving traces of the sampling points do not conform to the predefined curves C1 and C2. If the coordinate difference between the first sampling point p1, p1' and p1" and the predefined curve C1 and the coordinate difference between the second sampling point p2, p2' and p2" and the predefined curve C2 are both smaller than the distance threshold, the moving traces conform to the predefined curves C1 and C2. Generally, the coordinate difference between the sampling point p1 (or the sampling point p2) and the predefined curve C1 (or the predefined curve C2) can be, but not limited to, a minimal distance from the sampling point p1 (or the sampling point p2) to the predefined curve C1 (or the predefined curve C2).

Besides, the monitoring camera device 10 may set a first regression line S1 inside the first monitoring image I1 and a second regression line S2 inside the second monitoring image I2. The first regression line S1 can be computed by varied position of the first sampling point p1, p1' and p1" within the first monitoring image I1. The second regression line S2 can be computed by varied position of the second sampling point p2, p2' and p2" within the second monitoring image I2. When the operation processor 16 determines at least one of a distance between the first sampling point p1 and the first regression line S1 and a distance between the second sampling point p2 and the second regression line S2 is greater than the distance threshold, the first sampling point p1 cannot be matched with the second sampling point p2. When the operation processor 16 determines the distance between the first sampling point p1 and the first regression line S1 and the distance between the second sampling point p2 and the second regression line S2 are both smaller than the distance threshold, the first sampling point p1 can be matched with the second sampling point p2.

The operation processor 16 can further analyze a first sampling feature of the first sampling point p1 and a second sampling feature of the second sampling point p2. The foresaid sampling feature can be a height, gender, facial features, and a category of the target object. The operation processor 16 can compare the first sampling feature with the second sampling feature for deciding whether the first sampling point p1 is matched with the second sampling point p2. For example, if the position, the sampling point of time, the moving speed and the moving trace of the first sampling point p1 conform to the position, the sampling point of time, the moving speed and the moving trace of the second sampling point p2, but the first sampling feature defines the first sampling point p1 is a male and the second sampling feature defines the second sampling point p2 is a female, the first sampling point p1 cannot be matched with the second sampling point p2.

Moreover, the monitoring camera device 10 can include a position detector 18 disposed on the target object. The operation processor 16 can receive coordinate information output by the position detector 18 moving within the monitoring ranges of the first monitoring image I1 and the second monitoring image I2 in a wire way or a wireless way. The coordinate information can be used to determine whether the first sampling point p1 of the first monitoring image I1 and the second sampling point p2 of the second monitoring image I2 conform to actual motion of the target object, so as to determine whether the first sampling point p1 and the second sampling point p2 are matched, and then decide the sampling points can be eliminated or retained for the following image stitching process. In other possible situation, the position detector 18 may be a relative position generator adapted to compute a relative movement or a shifting trace between the monitoring camera device 10 and the sampling points.

In conclusion, the image stitching method and the related monitoring camera device of the present invention utilize a group consisting of space analysis in the first embodiment, period analysis in the second embodiment, speed analysis in the third embodiment, trace analysis in the further embodiment, and a combination thereof to effectively eliminate the sampling points which do not conform to the predefined condition, so as to decrease the amount of the false sampling points, and increase computation efficiency and accuracy of the image stitching process accordingly.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image stitching method of effectively decreasing an amount of sampling points, applied to a first monitoring image and a second monitoring image overlapped with each other, the image stitching method comprising:
   acquiring a first sampling point on the first monitoring image and a second sampling point on the second monitoring image;
   detecting a first specific parameter of the first monitoring image and a second specific parameter of the second monitoring image;
   determining whether the first sampling point is matched with the second sampling point according to the first specific parameter and the second specific parameter;
   acquiring a third sampling point on the first monitoring image and a fourth sampling point on the second monitoring image;
   detecting the first specific parameter of the first monitoring image and the second specific parameter of the second monitoring image;
   determining whether the third sampling point is matched with the fourth sampling point according to the first specific parameter and the second specific parameter; and
   utilizing the first sampling point, the second sampling point, the third sampling point and the fourth sampling point to stitch the first monitoring image and the second monitoring image when the first sampling point is matched with the second sampling point and the third sampling point is matched with the fourth sampling point.

2. The image stitching method of claim 1, wherein the first specific parameter and the second specific parameter respectively represent one predefined frame area on the first monitoring image and on the second monitoring image, and determining whether the first sampling point is matched with the second sampling point according to the first specific parameter and the second specific parameter comprises:
   determining the first sampling point and the second sampling point are matched when the first sampling point is located outside the predefined frame area on the first monitoring image and the second sampling point is located outside the predefined frame area on the second monitoring image.

3. The image stitching method of claim 2, wherein the predefined frame area is a center area on the first monitoring image and on the second monitoring image.

4. The image stitching method of claim 1, wherein the first specific parameter and the second specific parameter respectively represent one predefined monitoring period of the first monitoring image and the second monitoring image, and determining whether the first sampling point is matched with the second sampling point according to the first specific parameter and the second specific parameter comprises:
   determining the first sampling point and the second sampling point are matched when the first sampling point is appeared in the first monitoring image and the second sampling point is appeared in the second monitoring image during the predefined monitoring period.

5. The image stitching method of claim 1, wherein the first specific parameter represents one moving speed of the first sampling point inside the first monitoring image and the second specific parameter represents another moving speed of the second sampling point inside the second monitoring image, and determining whether the first sampling point is matched with the second sampling point according to the first specific parameter and the second specific parameter comprises:
   determining the first sampling point and the second sampling point are matched when difference between foresaid two moving speeds of the first sampling point and the second sampling point respectively inside the first monitoring image and the second monitoring image is smaller than a threshold.

6. The image stitching method of claim 1, wherein the first specific parameter and the second specific parameter respectively represent one predefined monitoring period of the first monitoring image and the second monitoring image, and determining whether the first sampling point is matched with the second sampling point according to the first specific parameter and the second specific parameter comprises:
   determining the first sampling point and the second sampling point are matched when one moving distance of the first sampling point inside the first monitoring image and another moving distance of the second sampling point inside the second monitoring image during the predefined monitoring period are within a predefined range.

7. The image stitching method of claim 1, wherein the first specific parameter and the second specific parameter respectively represent one predefined monitoring period of the first monitoring image and the second monitoring image, and determining whether the first sampling point is matched with the second sampling point according to the first specific parameter and the second specific parameter comprises:
   determining the first sampling point and the second sampling point are matched when difference between one moving distance of the first sampling point inside the first monitoring image and another moving distance of the second sampling point inside the second monitoring image during the predefined monitoring period is smaller than a threshold.

8. The image stitching method of claim 1, wherein the first specific parameter and the second specific parameter respectively represent one predefined curve inside the first monitoring image and inside the second monitoring image, and determining whether the first sampling point is matched with the second sampling point according to the first specific parameter and the second specific parameter comprises:
   determining the first sampling point and the second sampling point are matched when a moving trace of the first sampling point inside the first monitoring image conform to the predefined curve inside the first monitoring image and a moving trace of the second sampling point inside the second monitoring image conform to the predefined curve inside the second monitoring image.

9. The image stitching method of claim 8, wherein the moving trace conforms to the predefined curve when coordinate difference between the first sampling point and the predefined curve inside the first monitoring image or between the second sampling point and the predefined curve inside the second monitoring image is smaller than a threshold, the moving trace does not conform to the predefined curve when the coordinate difference is greater than the threshold.

10. The image stitching method of claim 9, wherein the coordinate difference between the first sampling point and the predefined curve is a minimal distance from the first sampling point to the predefined curve.

11. The image stitching method of claim 1, wherein the first specific parameter and the second specific parameter respectively represent one regression line inside the first monitoring image and inside the second monitoring image, the regression line is acquired by varied position of the first sampling point inside the first monitoring image or varied position of the second sampling point inside the second monitoring image, and determining whether the first sampling point is matched with the second sampling point according to the first specific parameter and the second specific parameter comprises:
   determining the first sampling point and the second sampling point are matched when one distance between the first sampling point inside the first monitoring image and the regression line and another distance between the second sampling point inside the second monitoring image and the regression line are smaller than a threshold.

12. The image stitching method of claim 1, further comprising:
   receiving coordinate information output by a position detector moving inside one monitoring range of the first monitoring image and another monitoring range of the second monitoring image, so as to acquire the first sampling point and the second sampling point matched with each other via the coordinate information.

13. The image stitching method of claim 1, further comprising:
   analyzing a first sampling feature of the first sampling point and a second sampling feature of the second sampling point;
   comparing the first sampling feature with the second sampling feature; and
   determining whether the first sampling point is matched with the second sampling point according to a comparison result.

14. A monitoring camera device, comprising:
   a first image receiver adapted to generate a first monitoring image;
   a second image receiver adapted to generate a second monitoring image partly overlapped with the first monitoring image; and
   an operation processor electrically connected to the first image receiver and the second image receiver, the operation processor being adapted to acquire a first sampling point on the first monitoring image and a second sampling point on the second monitoring image, to detect a first specific parameter of the first monitoring image and a second specific parameter of the second monitoring image, to determine whether the first sampling point is matched with the second sampling point according to the first specific parameter and the second specific parameter, to acquire a third sampling point on the first monitoring image and a fourth sampling point on the second monitoring image, to detect the first specific parameter of the first monitoring image and the second specific parameter of the second monitoring image, to determine whether the third sampling point is matched with the fourth sampling point according to the first specific parameter and the second specific parameter, and to utilize the first sampling point, the second sampling point, the third sampling point and the fourth sampling point to stitch the first monitoring image and the second monitoring image when the first sampling point is matched with the second sampling point and the third sampling point is matched with the fourth sampling point.

15. The monitoring camera device of claim 14, wherein the first specific parameter and the second specific parameter respectively represent one predefined curve inside the first monitoring image and inside the second monitoring image, the operation processor is further adapted to determine the first sampling point and the second sampling point are matched when a moving trace of the first sampling point inside the first monitoring image conform to the predefined curve inside the first monitoring image and a moving trace of the second sampling point inside the second monitoring image conform to the predefined curve inside the second monitoring image.

16. The monitoring camera device of claim 15, wherein the moving trace conforms to the predefined curve when coordinate difference between the first sampling point and the predefined curve inside the first monitoring image or between the second sampling point and the predefined curve inside the second monitoring image is smaller than a threshold, the moving trace does not conform to the predefined curve when the coordinate difference is greater than the threshold.

17. The monitoring camera device of claim 14, wherein the first specific parameter and the second specific parameter respectively represent one regression line inside the first monitoring image and inside the second monitoring image, the regression line is acquired by varied position of the first sampling point inside the first monitoring image or varied position of the second sampling point inside the second monitoring image, the operation processor is further adapted to determine the first sampling point and the second sampling point are matched when one distance between the first sampling point inside the first monitoring image and the regression line and another distance between the second sampling point inside the second monitoring image and the regression line are smaller than a threshold.

18. The monitoring camera device of claim 14, wherein the operation processor is further adapted to receive coordinate information output by a position detector moving inside one monitoring range of the first monitoring image and another monitoring range of the second monitoring image, so as to acquire the first sampling point and the second sampling point matched with each other via the coordinate information.

19. The monitoring camera device of claim 14, wherein the operation processor is further adapted to analyze a first sampling feature of the first sampling point and a second sampling feature of the second sampling point, to compare the first sampling feature with the second sampling feature, and to determine whether the first sampling point is matched with the second sampling point according to a comparison result.

20. An image stitching method of effectively decreasing an amount of sampling points, applied to a first monitoring image and a second monitoring image overlapped with each other, the image stitching method comprising:
  acquiring a first sampling point on the first monitoring image and a second sampling point on the second monitoring image;
  detecting a first specific parameter of the first monitoring image and a second specific parameter of the second monitoring image, wherein the first specific parameter and the second specific parameter respectively represent one predefined curve inside the first monitoring image and inside the second monitoring image;
  determining the first sampling point and the second sampling point are matched when a moving trace of the first sampling point inside the first monitoring image conform to the predefined curve inside the first monitoring image and a moving trace of the second sampling point inside the second monitoring image conform to the predefined curve inside the second monitoring image; and
  stitching the first monitoring image and the second monitoring image by the first sampling point and the second sampling point.

\* \* \* \* \*